United States Patent
Park et al.

(10) Patent No.: US 11,208,032 B2
(45) Date of Patent: Dec. 28, 2021

(54) VEHICLE CAPABLE OF PROJECTING LIGHT ONTO ROAD AND CONTROL METHOD THEREFOR

(71) Applicants: HYUNDAI MOTOR COMPANY, Seoul (KR); KIA MOTORS CORPORATION, Seoul (KR); KOREA UNIVERSITY RESEARCH & BUSINESS FOUNDATION, Seoul (KR)

(72) Inventors: Ji Soo Park, Yongin-si (KR); Jung Gi Han, Hwaseong-si (KR); Dong Hee Han, Seoul (KR); Yong Sin Kim, Seoul (KR)

(73) Assignees: HYUNDAI MOTOR COMPANY, Seoul (KR); KIA MOTORS CORPORATION, Seoul (KR); KOREA UNIVERSITY RESEARCH & BUSINESS FOUNDATION, Seoul (KR)

( * ) Notice: Subject to any disclaimer, the term of this patent is extended or adjusted under 35 U.S.C. 154(b) by 96 days.

(21) Appl. No.: 16/583,489

(22) Filed: Sep. 26, 2019

(65) Prior Publication Data

US 2020/0172000 A1 Jun. 4, 2020

(30) Foreign Application Priority Data

Dec. 4, 2018 (KR) .......................... 10-2018-0154216

(51) Int. Cl.
*B60Q 1/22* (2006.01)
*B60Q 1/34* (2006.01)
(Continued)

(52) U.S. Cl.
CPC ............... *B60Q 1/22* (2013.01); *B60Q 1/346* (2013.01); *F21S 41/675* (2018.01); *F21S 43/31* (2018.01); *G02B 26/085* (2013.01)

(58) Field of Classification Search
CPC . B60Q 1/22; F21S 41/675; F21S 43/31; F21S 43/321; F21S 43/30; F21S 43/32; F21S 43/39; F21S 43/37; F21V 23/0471; F21V 23/0478; F21V 14/04; G02B 6/0841; G02B 6/0833; G02B 6/085; G02B 6/0858; G02B 26/0841; G02B 26/0833; G02B 26/085; G02B 26/0858
See application file for complete search history.

(56) References Cited

U.S. PATENT DOCUMENTS 6,122,089 A * 9/2000 Minamoto ........... G02B 26/105
359/198.1
9,612,436 B1 * 4/2017 Hoffman .............. G02B 26/105
(Continued)

*Primary Examiner* — Erin Kryukova
(74) *Attorney, Agent, or Firm* — Lempia Summerfield Katz LLC

(57) ABSTRACT

A vehicle projects various types of light beams onto a road using a light-emitting module. The light-emitting module includes: a reflection unit, and a light source unit to emit light to the reflection unit. The reflection unit includes: a first pole magnet and a second pole magnet facing each other while being spaced apart from each other; a plate disposed between the first pole magnet and the second pole magnet, and a wire disposed in a multiple number of turns in one direction along an edge of the plate; and a reflection surface disposed on the upper surface of the plate.

14 Claims, 18 Drawing Sheets

(51) Int. Cl.
*F21S 43/31* (2018.01)
*F21S 41/675* (2018.01)
*G02B 26/08* (2006.01)

(56) References Cited

U.S. PATENT DOCUMENTS

| | | | |
|---|---|---|---|
| 10,598,924 B2* | 3/2020 | Ostaszewski | F16F 15/04 |
| 2005/0219677 A1* | 10/2005 | Krylov | G02B 26/0841 |
| | | | 359/245 |
| 2006/0193067 A1* | 8/2006 | Kim | G02B 26/105 |
| | | | 359/872 |
| 2009/0015388 A1* | 1/2009 | Yagi | B60Q 1/24 |
| | | | 340/435 |
| 2009/0046474 A1* | 2/2009 | Sato | F21S 41/675 |
| | | | 362/466 |
| 2010/0208322 A1* | 8/2010 | Borchers | H04N 9/3129 |
| | | | 359/223.1 |
| 2015/0156448 A1* | 6/2015 | Lee | F21S 43/13 |
| | | | 348/745 |
| 2016/0124214 A1* | 5/2016 | Freedman | H02K 33/16 |
| | | | 359/199.3 |
| 2017/0028902 A1* | 2/2017 | Diaz | B60Q 1/22 |
| 2018/0106455 A1* | 4/2018 | Uchida | F21S 41/285 |
| 2018/0328564 A1* | 11/2018 | Albou | F21S 43/00 |

* cited by examiner

VEHICLE CAPABLE OF PROJECTING LIGHT ONTO ROAD AND CONTROL METHOD THEREFOR

This application claims priority to and the benefit of Korean Patent Application No. 10-2018-0154216, filed on Dec. 4, 2018, the entire contents of which are incorporated herein by reference.

FIELD

The present disclosure relates to a vehicle capable of projecting various types of light beams onto a road and a control method therefor.

BACKGROUND

The statements in this section merely provide background information related to the present disclosure and may not constitute prior art.

Due to the recent development of various sensors, cameras and display technologies, various information is provided to drivers in various forms in order to assist driving of the vehicle. In general, when driving backwards, a driver views a rear object by the naked eye by, for example, turning the head backwards or using a room mirror or a side mirror. However, in recent years, many drivers increasingly tend to use cameras and sensors in order to recognize a rear object.

FIGS. 1A to 1C show exemplary forms in which information is provided to a driver during backward driving of a general vehicle.

Referring to FIG. 1A, when the R-range is input, an image of a rear view camera is displayed through a display of a head unit. At this time, a guide line 111, indicating the traveling path that the vehicle will take when traveling straight backwards and the width of the vehicle, and a guide line 113, indicating the traveling path that the vehicle will take when the steering wheel is turned, may be displayed in the corresponding image.

FIG. 1B shows a screen in which an around-view-monitor (AVM) function is executed using a plurality of cameras mounted at different positions. Here, an image captured by a specific camera may be displayed in one region 121 of the screen, and a top view image showing a periphery of the vehicle when looking down from above, which is obtained by processing and synthesizing images captured by a plurality of cameras, may be displayed in another region 123 of the screen.

In general, when a vehicle is driven backwards, the around-view image shown in FIG. 1B is displayed together with the image of the rear view camera shown in FIG. 1A. Thus, the driver is capable of obtaining more information than in the case in which only the rear view image shown in FIG. 1A is displayed. However, we have discovered that although the around-view function is provided, there is still a problem in that the quality of an image captured by the camera is degraded at night or on rainy days, as shown in FIG. 1C, and thus it is difficult for the driver to recognize a pedestrian.

Even when a warning sound of the ultrasonic sensor in addition to an image of the camera is used, we have found that the recognition range of the ultrasonic sensor is smaller than that of the camera. Further, when a commercial vehicle or the like is driven backwards, a warning sound may be output to the outside, but a pedestrian may not hear the warning sound if the pedestrian is wearing headphones or is in a noisy environment.

SUMMARY

The present disclosure provides a vehicle capable of projecting light onto a road and a control method therefor so that a pedestrian behind the vehicle easily recognizes the light and when a pedestrian is present within the range within which the light is projected, the driver easily recognizes the pedestrian using the light radiated on the body of the pedestrian.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

In one form of the present disclosure, a light-emitting module includes: a reflection unit, and a light source unit configured to emit light to the reflection unit, wherein the reflection unit includes a first pole magnet and a second pole magnet facing each other while being spaced apart from each other, a plate, along the edge of which a wire is disposed in a multiple number of turns in one direction, the plate being disposed between the first pole magnet and the second pole magnet, and a reflection surface disposed on the upper surface of the plate, and wherein the light source unit emits light to the reflection surface.

The light-emitting module may further include a driving unit configured to supply current to the wire and to alternately change the direction of the current.

The light-emitting module may further include at least one elastic member disposed on the lower surface of the plate in order to support the plate and to allow vibration of the plate.

The plate may vibrate in a seesaw motion with respect to the position of the at least one elastic member depending on the alternate change in the direction of the current by the driving unit.

Light emitted from the light source unit may be reflected by the reflection surface and may be projected in the manner of reciprocating in the lateral direction in response to the vibration of the plate.

The at least one elastic member may include a plurality of elastic members. The plurality of elastic members may be disposed parallel to each other in a direction intersecting the direction of a magnetic flux generated by the first pole magnet and the second pole magnet, and the direction in which the plurality of elastic members is disposed parallel to each other may be parallel to the axis of the seesaw motion.

The wire may extend from the driving unit and may be connected to the plate via the elastic member.

When current is supplied to the wire, force may be exerted on a first side portion of the plate that is adjacent to the first pole magnet in a first direction that intersects the direction of the current and the magnetic flux flowing direction between the first pole magnet and the second pole magnet, and force may be exerted on a second side portion of the plate that is adjacent to the second pole magnet in a second direction that is opposite the first direction.

The wire may diverge from one end thereof into two pieces. The two pieces of the wire may extend from different points of the edge of the plate so as to form the same number of turns as each other in the one direction along the edge of the plate, and may converge at the opposite end of the wire.

The light-emitting module may further include a control unit configured to determine at least one of an on/off pattern of the light source unit or a period at which the driving unit alternately changes the direction of the current.

The control unit may determine at least one of the on/off pattern or the period depending on the state of a transmission of a vehicle and the position of an obstacle sensed by a sensor.

The light source unit may include a plurality of light sources.

Light sources of the plurality of light sources may be disposed parallel to each other in the vertical direction, and may have different angles of incidence from each other with respect to the reflection surface.

The light-emitting module may be disposed at the rear side of the vehicle so as to project light onto a road behind the vehicle.

It is to be understood that both the foregoing general description and the following detailed description of the present disclosure are exemplary and explanatory and are intended to provide further explanation of the present disclosure as claimed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
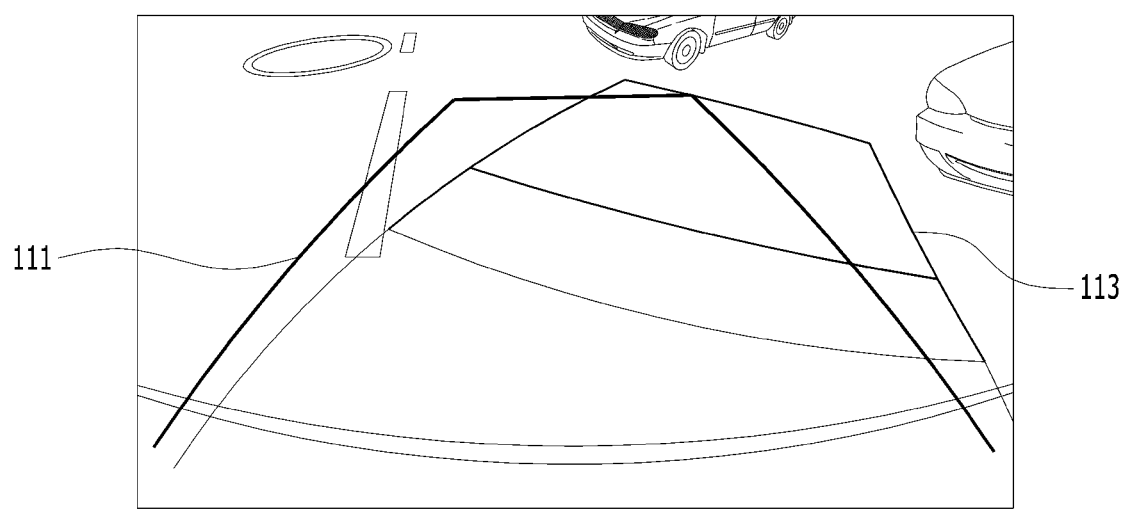
FIGS. 1A to 1C show exemplary forms in which information is provided to a driver during backward driving of a general vehicle.
Figure 1B:
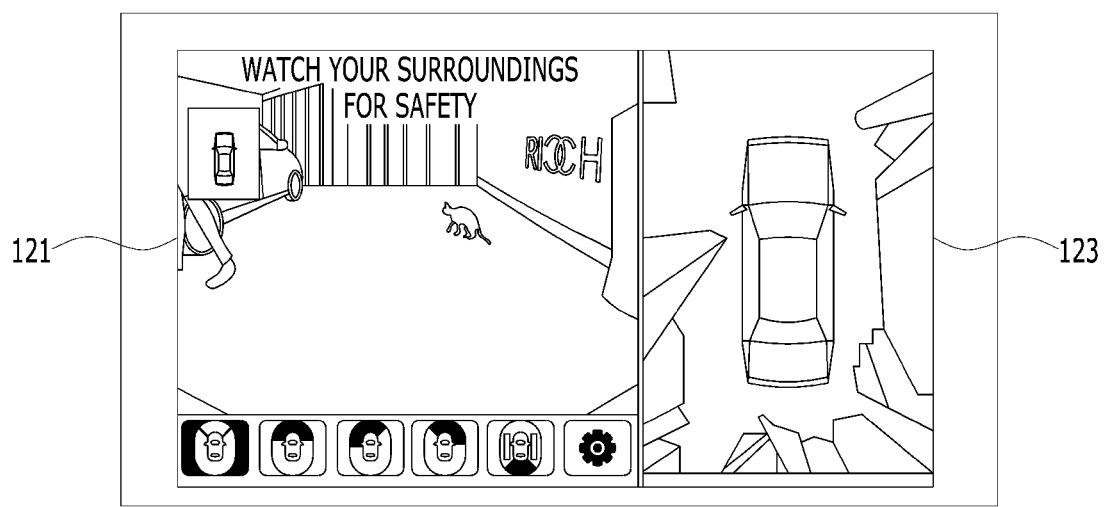
Figure 1C:
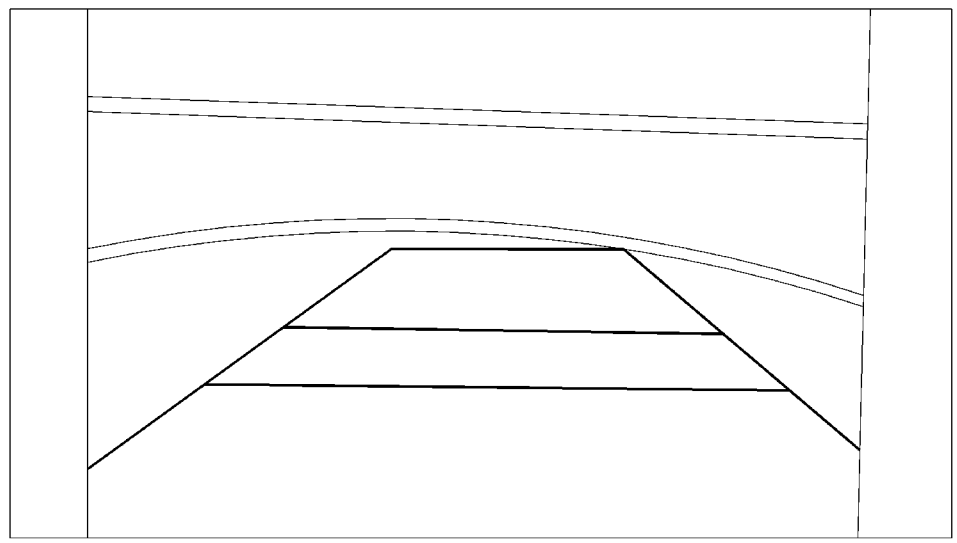

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be understood that the present disclosure should not be limited to the exemplary forms and may be modified in various ways. In the drawings, to clearly and briefly explain the present disclosure, an illustration of elements having no connection with the description is omitted, and the same or extremely similar elements are designated by the same reference numerals throughout the specification.

Throughout the specification, when an element is referred to as "including" another element, the element should not be understood as excluding other elements so long as there is no special conflicting description, and the element may include at least one other element. Wherever possible, the same reference numbers will be used throughout the drawings to refer to the same or like parts.

Also, the terms, such as 'unit' or 'module', etc., should be understood as a unit that processes at least one function or operation and that may be embodied in a hardware manner (e.g., a processor), a software manner, or a combination of the hardware manner and the software manner. For example, a light-emitting module may be referred to as 'light-emitting device', a reflection unit may be referred to as 'reflector', a light source unit may be referred to as 'light source', a control unit may be referred to as 'controller', and a driving unit 300 may be referred to as 'driver' or 'driving device', respectively.

According to one form of the present disclosure, a reflection angle of light emitted from a light source is controlled by controlling the vibration of a reflection structure using the Lorentz force law, thereby enabling projection of light onto a road located in a specific direction of a vehicle.

Hereinafter, the structure of a light-emitting module according to exemplary forms of the present disclosure will be described briefly with reference to FIG. 2.

Figure 2:
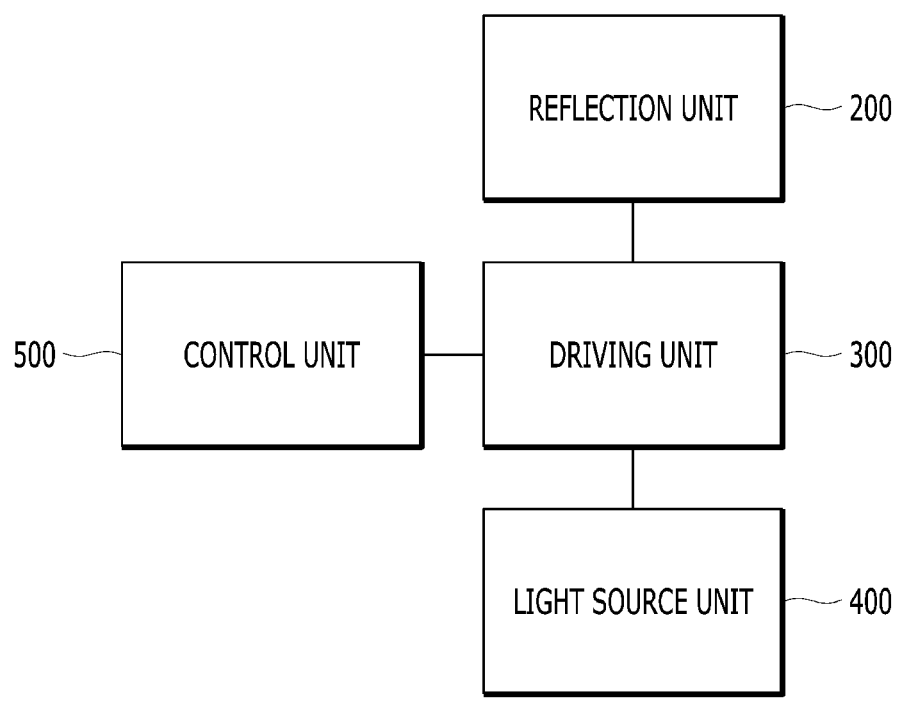
FIG. 2 is a block diagram showing an example of the structure of a light-emitting module.

FIG. 2 is a block diagram showing an example of the structure of a light-emitting module that is applicable to forms of the present disclosure.

Referring to FIG. 2, the light-emitting module may include: a reflection unit 200, a light source unit 400 configured to emit light to be reflected by the reflection unit 200, a control unit 500, and a driving unit 300 configured to supply driving power to the reflection unit 200 and the light source unit 400 in response to a control signal from the control unit 500. The control unit 500 performs overall control of the light-emitting module based on information exchanged with various sensors and/or controllers provided in a vehicle.

The light source unit 400 may include at least one light source, and each light source may be disposed so as to emit light toward a reflection surface of the reflection unit 200. Examples of the light source may include a light-emitting diode, a laser diode, and the like. However, the present disclosure is not limited thereto. In consideration of visibility and straightness, the light source unit 400 may include a light source capable of emitting laser light.

The reflection unit 200 includes a reflection surface, which performs a mechanical motion in order to reflect the light emitted from the light source unit 400 so that the light is projected in a desired direction.

The driving unit 300 may selectively change the light-emitting state of the light source of the light source unit 400 in response to a control signal from the control unit 500. In addition, the driving unit 300 may control the range within which the light is projected from the reflection unit 200 by changing the direction of the current supplied to the reflection unit 200.

The control unit 500 may determine the operation type of the light-emitting module based on information acquired from at least one of the sensors (e.g. a rear-lateral side ultrasonic sensor, a blind spot detection (BSD) sensor, a vision sensor, a LIDAR sensor, etc.) or backward-driving-related sensors (e.g. a transmission controller for detecting an R-range, a head unit, an advanced driver assistance system (ADAS) controller, etc.), which are provided in the vehicle. For example, the control unit 500 may determine the type of the light source to be turned on, the illumination pattern, the brightness, and the like of the light source unit 400, and may determine at least one of the period or amplitude of vibration to be applied to the reflection surface of the reflection unit 200.

Hereinafter, the operation of respective components will be described in detail with reference to the accompanying drawings.

First, the operation principle of the reflection unit according to the exemplary forms of the present disclosure will be described with reference to FIGS. 3A and 3B. In the following drawings including FIGS. 3A and 3B, a Cartesian coordinate system is used for convenience of explanation.

Figure 3A:
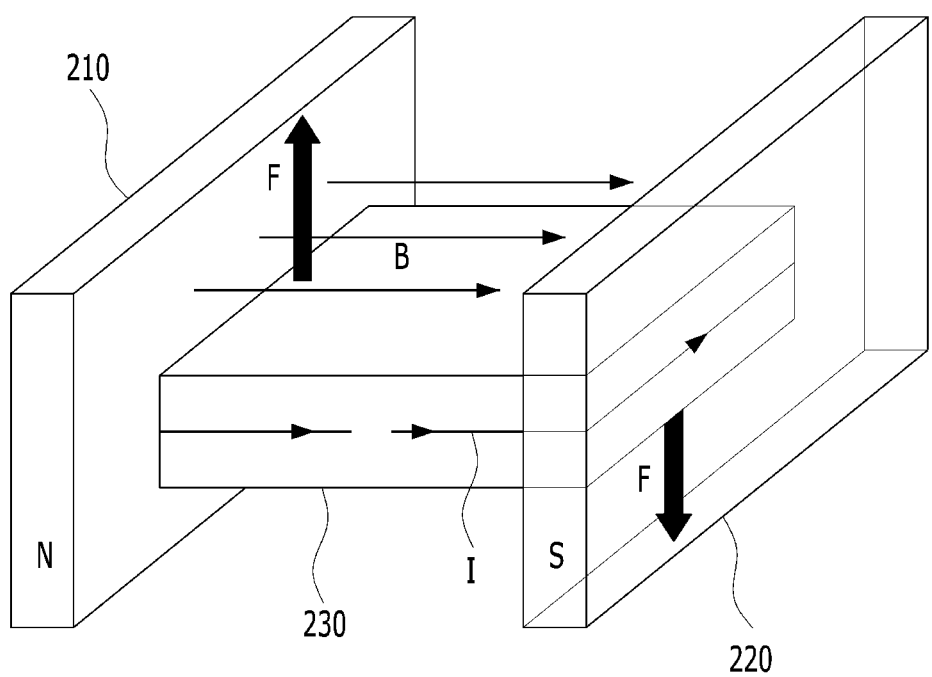
FIGS. 3A and 3B are views showing the operation principle of a reflection unit.
Figure 3A:
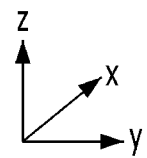
Figure 3B:
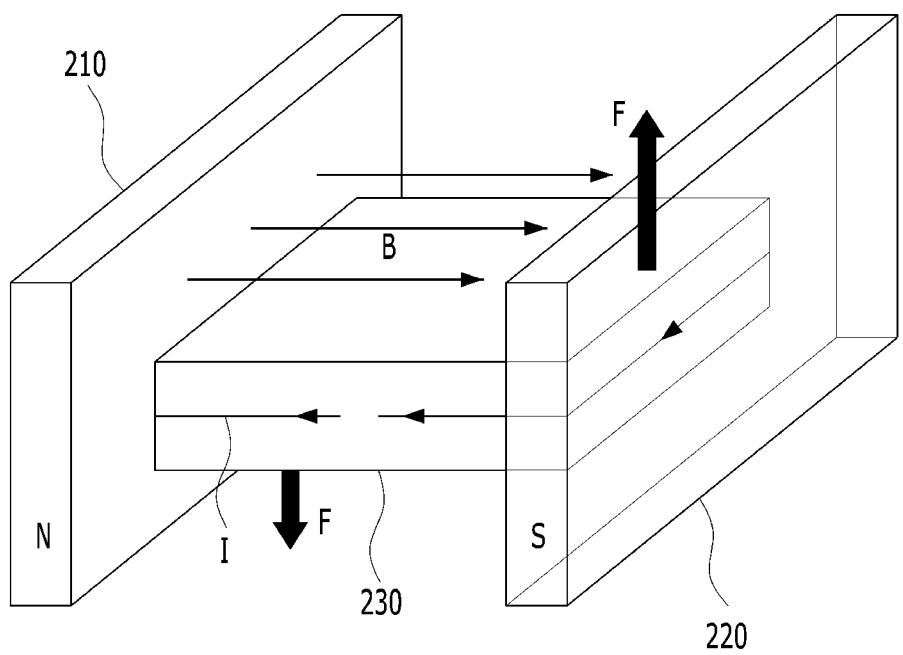
Figure 3B:
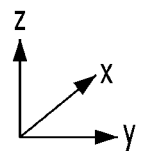

FIGS. 3A and 3B are views showing the operation principle of the reflection unit that is applicable to the present disclosure.

Referring to FIGS. 3A and 3B, a plate 230 is disposed between a first pole magnet 210 (here, an N pole) and a second pole magnet 220 (here, an S pole), which face each other. Thus, the direction of the magnetic flux density B is oriented from the N pole to the S pole (i.e. the y-axis direction). In addition, wires may be disposed so that current flows along the side surfaces of the plate 230 in the clockwise or counterclockwise direction with respect to the plane (i.e. the x-y plane).

As shown in FIG. 3A, when the current I flows in the counterclockwise direction with respect to the plane, according to the Lorentz force law, force is exerted on the side surface of the plate 230 that is adjacent to the first pole magnet 210 in the upward direction (i.e. the z-axis direction), and force is exerted on the side surface of the plate 230 that is adjacent to the second pole magnet 220 in the downward direction (i.e. the "z" axis direction).

On the other hand, as shown in FIG. 3B, when the current I flows in the clockwise direction with respect to the plane, the directions in which the force is exerted on the side surfaces of the plate 230 are reversed relative to the directions shown in FIG. 3A.

The structure of the reflection unit, which is vibrated by the force exerted on the plate as described above with reference to FIGS. 3A and 3B, will now be described with reference to FIGS. 4A to 4C.

Figure 4A:
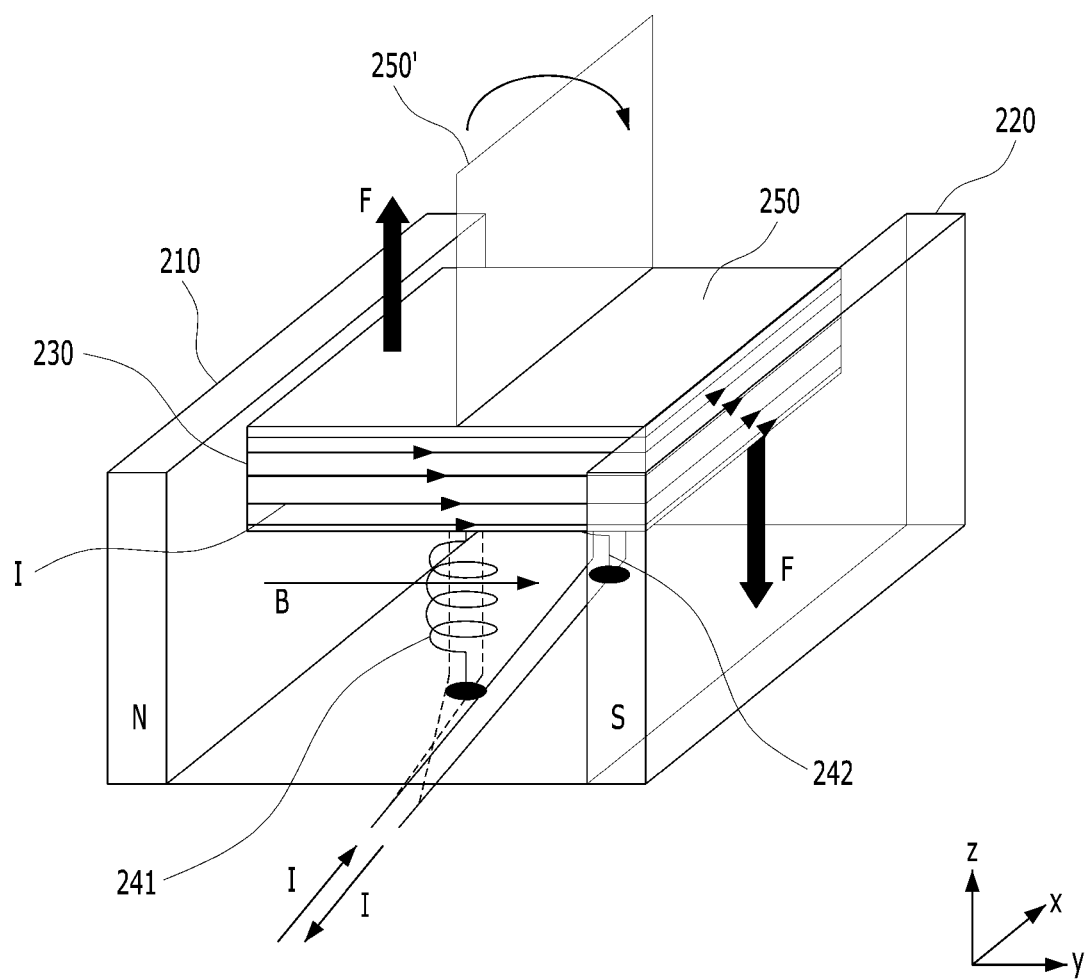
FIGS. 4A to 4C show examples of the structure of the reflection unit.
Figure 4B:
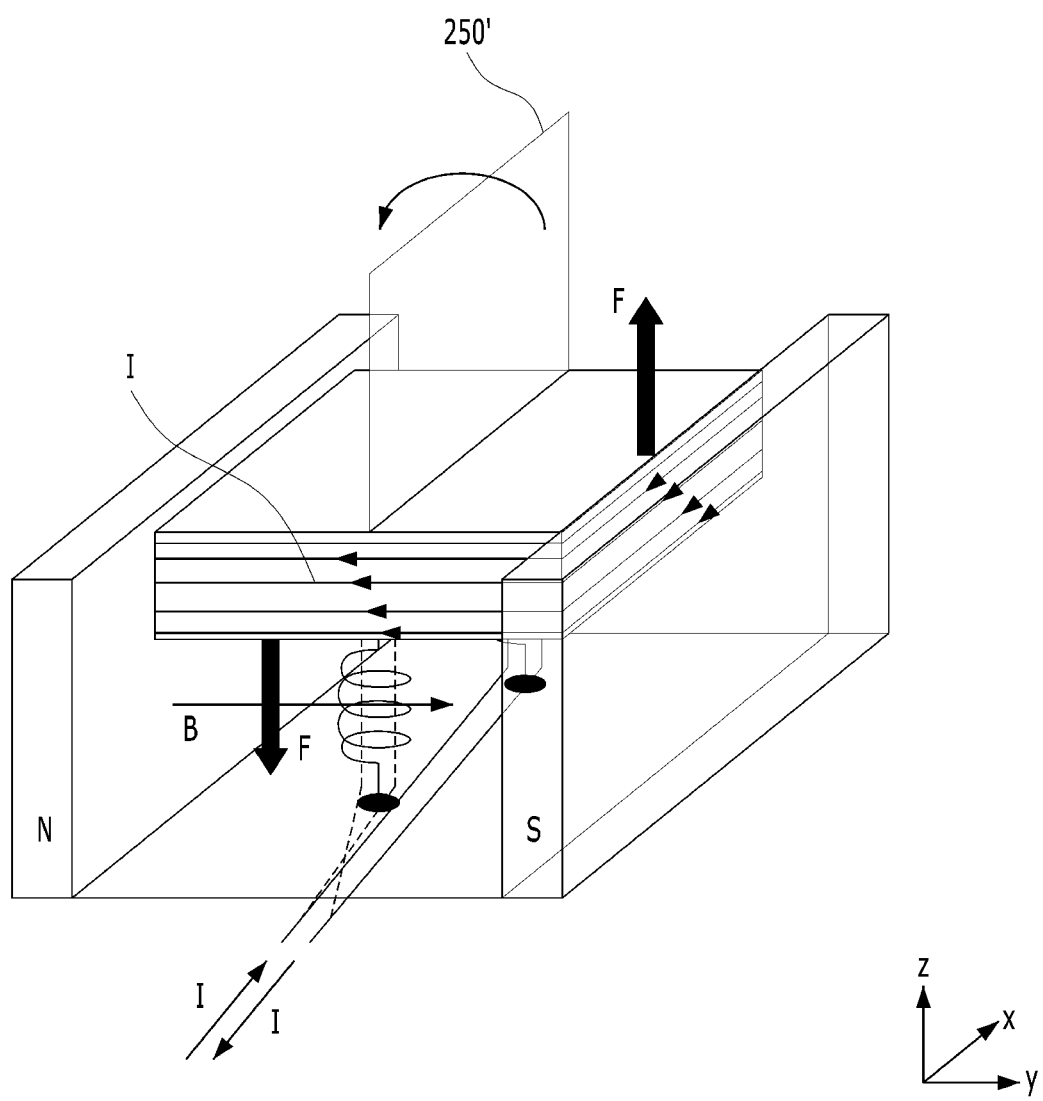
Figure 4C:
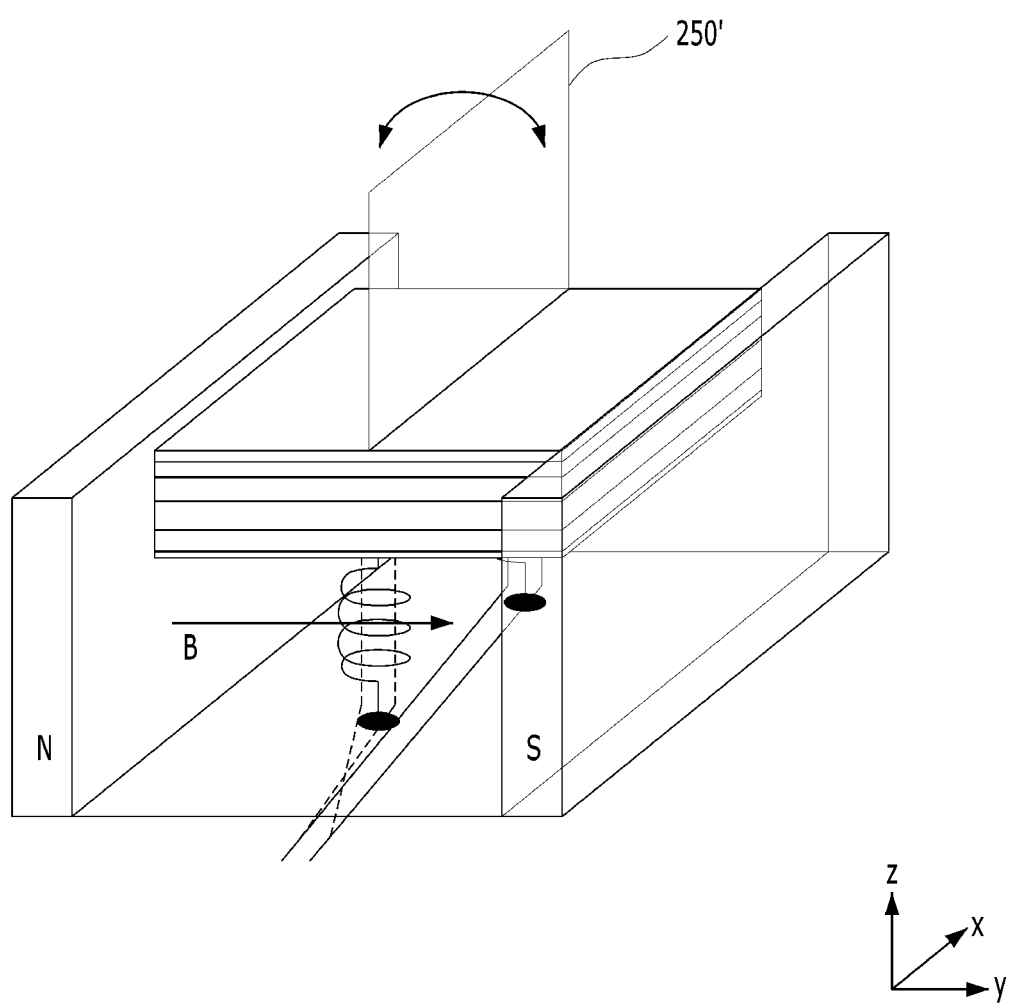

FIGS. 4A to 4C show examples of the structure of the reflection unit that is applicable to the present disclosure.

A description of the components explained above with reference to FIGS. 3A and 3B will be omitted. Referring to FIGS. 4A and 4B, the lower surface of the plate 230 is supported by elastic members 241 and 242. The elastic members 241 and 242 serve to allow vibration of the plate 230, which appears in the form of a seesaw motion in the y-z plane in accordance with a change in the direction of the Lorentz force corresponding to a change in the direction of the current. Thus, the elastic members 241 and 242 may be springs, but are not limited thereto, so long as they are capable of supporting the plate 230 and allowing the vibration of the plate 230. For example, two elastic members 241 and 242 may be disposed so as to be spaced apart from each other in a direction (here, the x-axis direction) that intersects the direction (i.e. the y-axis direction) of the magnetic flux B. An imaginary line that interconnects the points at which the two elastic members 241 and 242 are connected to the lower surface of the plate 230 may correspond to the axis of the vibration motion.

The upper surface of the plate 230 may be provided with a reflection surface 250, which reflects light emitted from a light source (not shown) to be described later. An imaginary surface 250', which is perpendicular to the reflection surface 250 and is disposed in the x-y plane, may be illustrated to assist explanation of the motion direction of the plate, but may not be an actual component. For example, the imaginary surface 250' may correspond to the projection direction of the reflected light, which changes depending on the vibration of the plate in the state in which the light source (not shown) is fixed.

As shown in FIG. 4A, when the current I flows in the counterclockwise direction with respect to the plane, according to the Lorentz force law, force is exerted on the side surface of the plate 230 that is adjacent to the first pole magnet 210 in the upward direction (i.e. the z-axis direction), and force is exerted on the side surface of the plate 230 that is adjacent to the second pole magnet 220 in the downward direction (i.e. the "z" axis direction). Thus, when viewed from the front (i.e. when viewed in the "x" axis direction), the imaginary surface 250' may move so as to tilt to the right.

On the other hand, as shown in FIG. 4B, when the current I flows in the clockwise direction with respect to the plane, the directions in which the force is exerted on the side surfaces of the plate 230 are reversed relative to the directions shown in FIG. 4A. Thus, when viewed from the front (i.e. when viewed in the x-axis direction), the imaginary surface 250' may move so as to tilt to the left.

In this manner, when the direction in which the current flows along the side surfaces of the plate 230 is alternately changed, as shown in FIG. 4C, the imaginary surface 250' vibrates along a fan-shaped or arc-shaped path when viewed from the front (i.e. when viewed in the x-axis direction). Thus, even when a point light source fixed to a certain point is used, light emitted from the point light source may be reflected by the reflection surface 250, which vibrates, and thus may be projected along a linear path through the leftward-rightward reciprocating motion. As a result, it is possible to increase the output range of the light in the lateral direction using the reflection unit 200 according to the form, and it is also possible to adjust the output range of the light by controlling the amplitude of vibration. The amplitude of vibration may be controlled by controlling at least one of the elasticity of the elastic members 241 and 242, the weight of the plate 230, the magnitude of the current I, the magnitude of the magnetic flux B, or the current direction switching frequency.

Next, the arrangement of wires in the reflection unit will be described with reference to FIGS. 5A to 5D. FIGS. 5A to 5D show examples of the arrangement of wires in the reflection unit according to one form of the present disclosure. Although it is illustrated in FIGS. 5A to 5D that wires are disposed around the plate 230 when viewed in plan, this is for better understanding of the present disclosure. Actually, the wires may be disposed on the side surfaces of the plate 230, or may be disposed inside the edge of the plate 230. In order to be connected with the driving unit 300, as shown in FIGS. 4A to 4C, the wires may be disposed on the plate 230 via the elastic members 241 and 242. For example, when the elastic members 241 and 242 are springs, each of the wires may pass through the center of a respective one of the springs in the direction in which the springs extend.

Figure 5A:
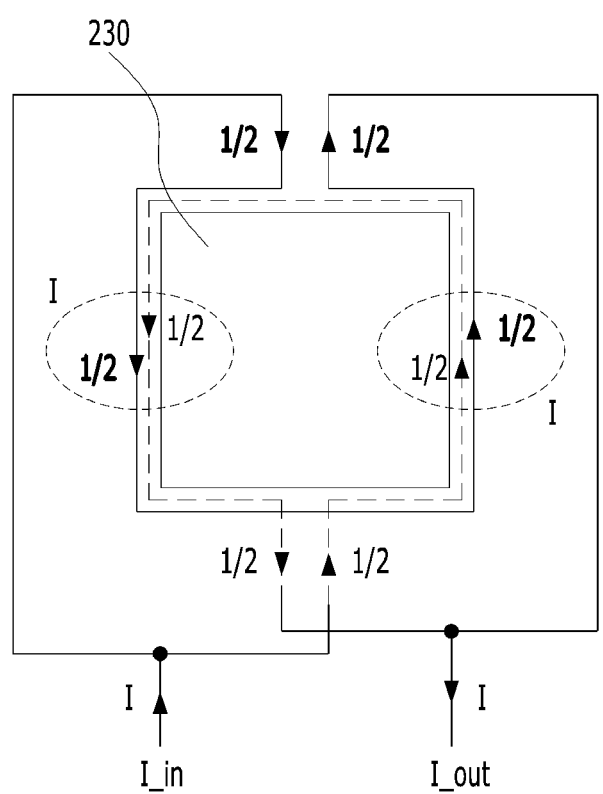
FIGS. 5A to 5D show examples of the arrangement of wires in the reflection unit.
Figure 5B:
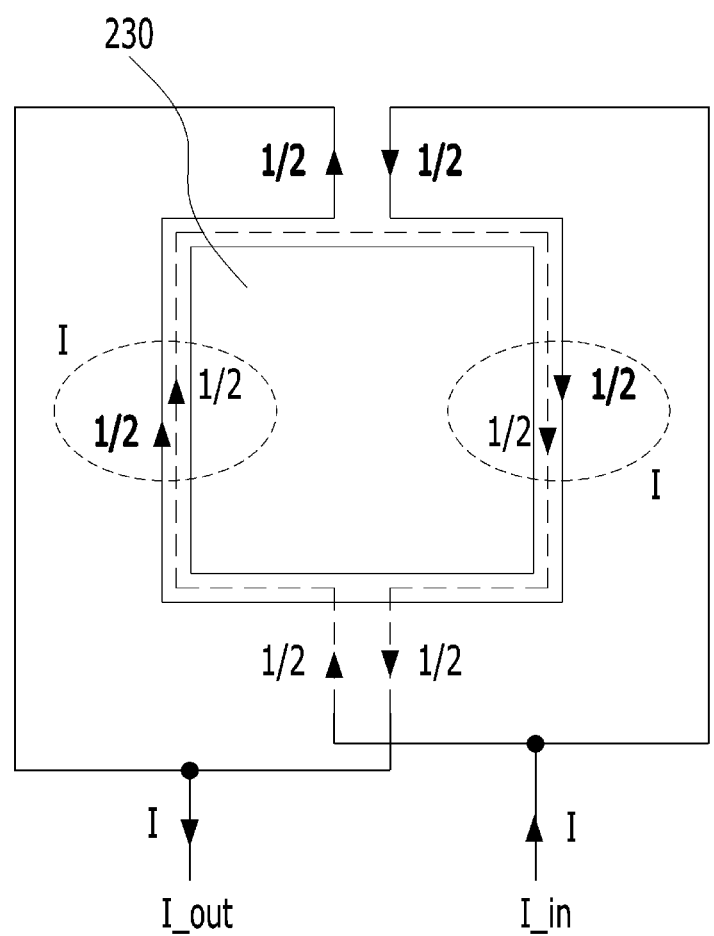

Referring to FIGS. 5A and 5B, current paths corresponding to two turns may be formed around the plate 230 due to the wires. When viewed in plan, the wires may diverge from a current input path I_in in opposite directions to each other, may extend along the edge of the plate 230 in the same direction (here, the clockwise direction) so as to form one turn each, and may converge at a current output path I_out. Thus, the amount of current flowing through a single turn of wire is half (I/2) the total amount of current I due to the divergence. However, the total amount of electric charge that is influenced by the magnetic flux B on one side surface of the plate corresponds to I due to the presence of two turns of the wire. The purpose of this configuration is to reduce the magnitude of the current flowing through each turn of wire so that the direction of the direct current is rapidly changed.

Figure 5C:
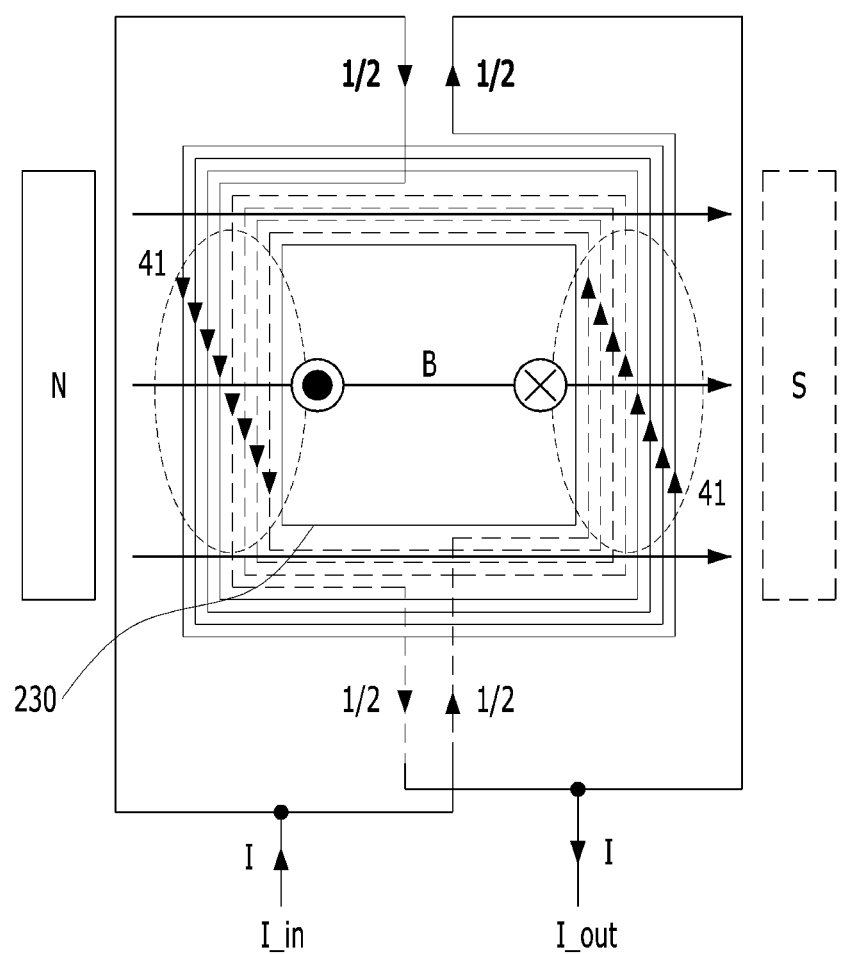
Figure 5D:
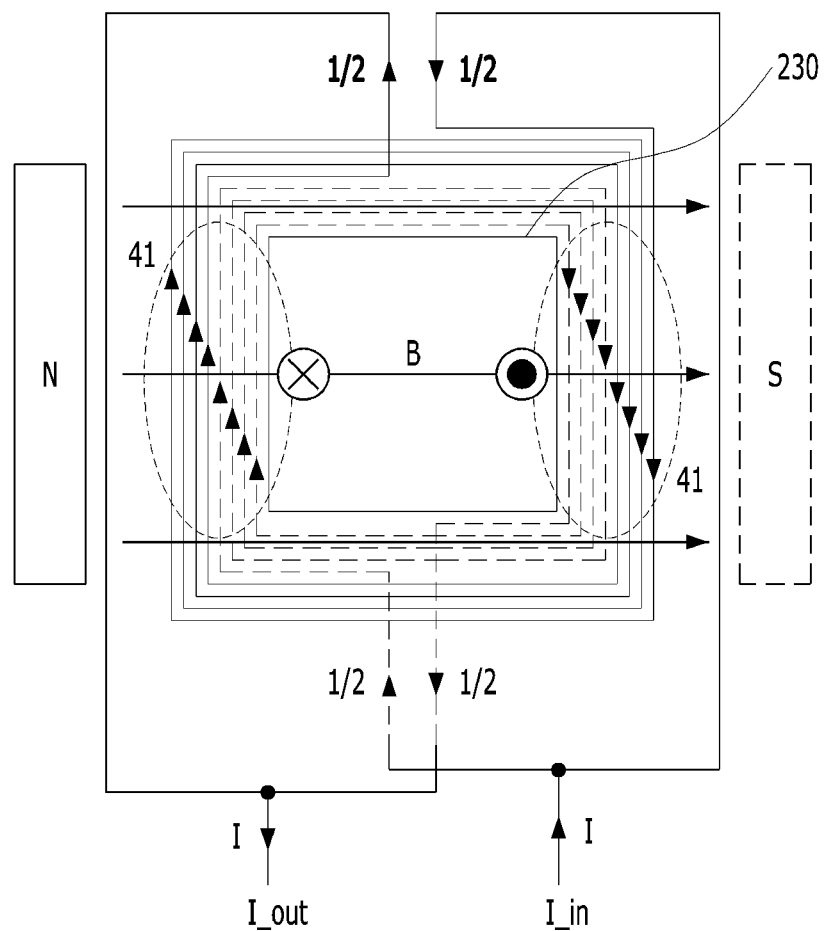

As shown in FIGS. 5C and 5D, in the case in which the number of turns of each of the wires diverging from the current input path is increased from one to four, the total number of turns of wire becomes eight. Thus, the total amount of the electric charge that is influenced by the magnetic flux B on one side surface of the plate 230 corresponds to 4I. Therefore, in the case in which the wires are disposed in the diverging structure shown in FIGS. 5C and 5D, while the magnitude of current is decreased due to the resistance of the wires, the magnitude of vibration generated by the Lorentz force is increased due to the increase in the number of turns, thereby making it possible to rapidly change the direction of the current.

Hereinafter, a reflection-unit-driving circuit 310 of the driving unit 300 for driving the reflection unit will be described with reference to FIG. 6.

Figure 6:
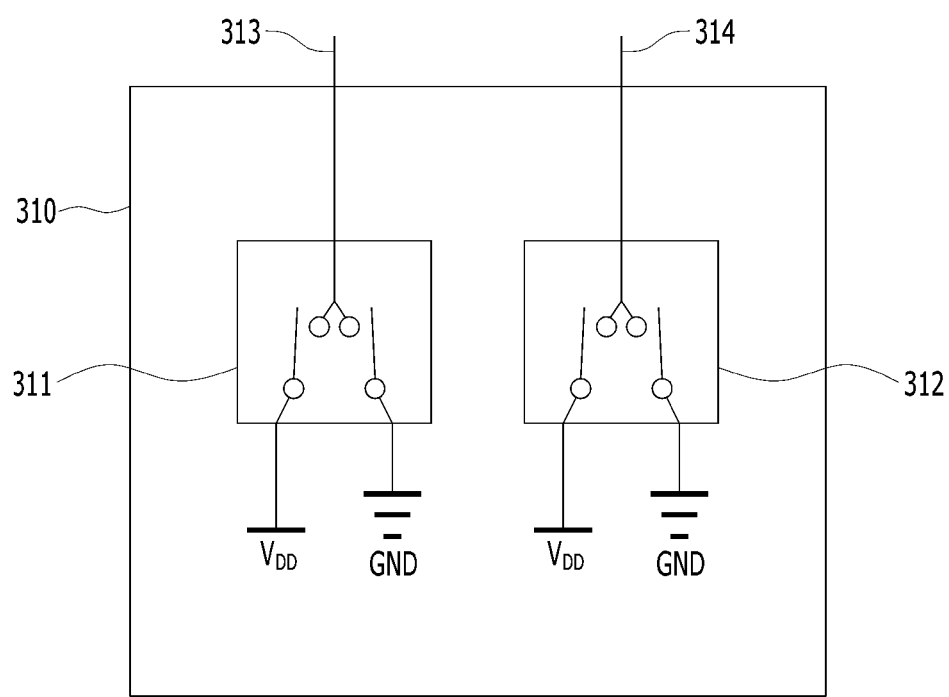
FIG. 6 shows an example of the configuration of a reflection-unit-driving circuit.

FIG. 6 shows an example of the configuration of a reflection-unit-driving circuit according to one form of the present disclosure.

Referring to FIG. 6, the reflection-unit-driving circuit 310 may include a first switch 311, a second switch 312, a first terminal 313, and a second terminal 314.

The first switch 311 may be configured such that the first terminal 313 is selectively connected to any one of a power source $V_{DD}$ and a ground GND, and the second switch 312 may be configured such that the second terminal 314 is selectively connected to any one of the power source $V_{DD}$ and the ground GND. The first terminal 313 and the second terminal 314 are connected to the wires of the reflection unit 200. Each switch may be implemented as a semiconductor-based switching element.

When one switch is connected to the power source, the other switch is connected to the ground. For example, when the first switch 311 is connected to the power source and the second switch 312 is connected to the ground, the current flows from the first terminal 313 to the second terminal 314 via the reflection unit 200. When the first switch 311 is connected to the ground and the second switch 312 is connected to the power source, the current flows from the second terminal 314 to the first terminal 313 via the reflection unit 200.

As such, the driving unit 300 changes the operation modes of the switches 311 and 312 of the reflection-unit-driving circuit 310, thereby changing the direction in which the current flows through the wires of the reflection unit 200.

Hereinafter, the process in which the light emitted from the light source unit 400 is reflected by the reflection unit 200 and is projected onto a road will be described with reference to FIG. 7.

Figure 7:
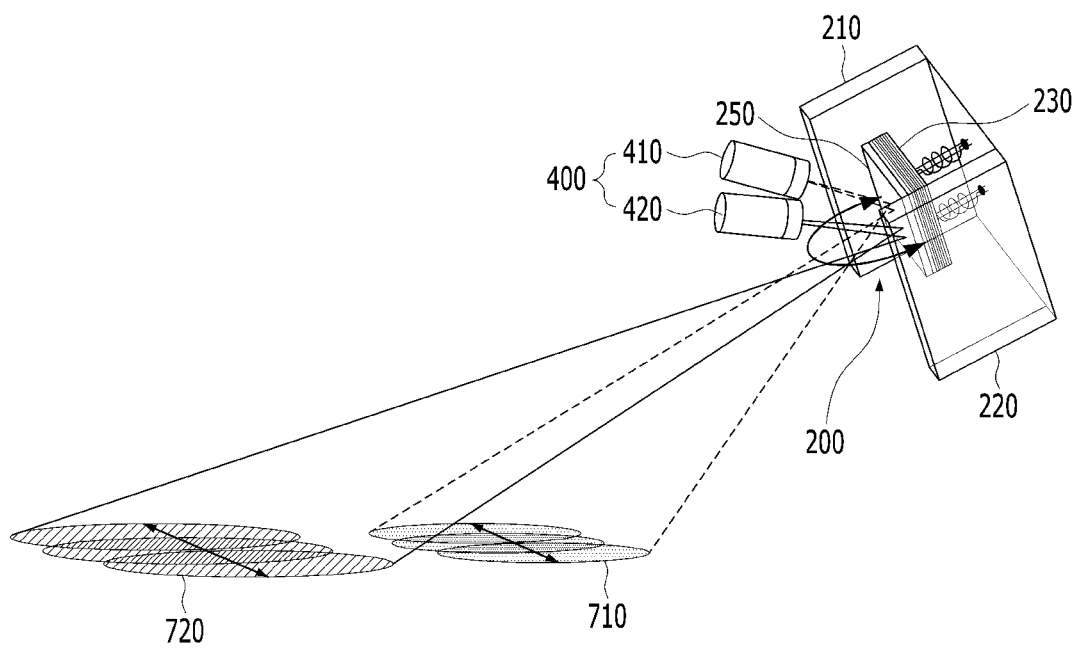
FIG. 7 is a view showing the operation of the light-emitting module.

FIG. 7 is a view showing the operation of the light-emitting module according to one form of the present disclosure.

Referring to FIG. 7, the light source unit 400 includes two light sources 410 and 420, which are disposed so as to be parallel to each other in the vertical direction and to emit light at an angle below the horizontal plane. The angle at which the light from the first light source 410 is incident on the reflection surface 250 and the angle at which the light from the second light source 420 is incident on the reflection surface 250 are different from each other. For example, the angle of incidence of the light from the first light source 410 with respect to a normal line to the reflection surface 250 may be greater than the angle of incidence of the light from the second light source 420.

The reflection unit 200 is disposed at a predetermined angle such that the light emitted from the light source unit 400 and reflected by the reflection surface 250 is projected onto a road.

In this state, when the plate 230 having the reflection surface 250 attached thereto is vibrated by the driving unit, reflected light 710 from the first light source 410, having a relatively large incidence angle, may be projected onto a region of the road that is relatively close to the light-emitting module, and reflected light 720 from the second light source 420, having a relatively small incidence angle, may be projected onto a region of the road that is relatively distant from the light-emitting module. At this time, each of the reflected light 710 and the reflected light 720 may be projected onto the road in the manner of reciprocating in the lateral direction, as indicated by the arrows, due to the vibration of the plate 230.

Therefore, as the vibration angle of the plate 230 increases, the path along which each of the reflected light 710 and the reflected light 720 is projected onto the road becomes longer, and as the vibration angle of the plate 230 decreases, the path along which each of the reflected light 710 and the reflected light 720 is projected onto the road becomes shorter. The reciprocating speed of each of the reflected light 710 and the reflected light 720 may be proportional to the frequency of the vibration of the plate 230.

In addition, as the number of light sources having different angles of incidence with respect to the reflection surface 250 increases, light beams may be projected from the vehicle onto a greater number of regions of the road, the regions being spaced apart from the vehicle by respectively different distances.

Meanwhile, in the state in which the vibration of the plate 230 is maintained, it is also possible to project light only onto a specific region of the road by turning the light source on and off. This will be described below with reference to FIG. 8.

Figure 8:
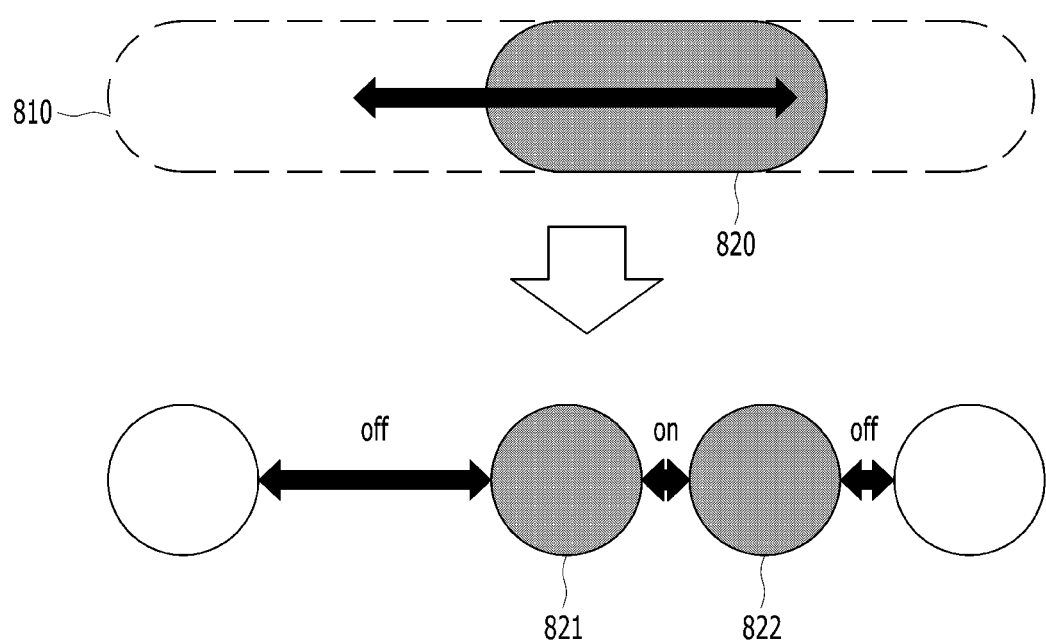
FIG. 8 is a view showing a method of projecting light only onto a specific region of a road.

FIG. 8 is a view showing a method of projecting light only onto a specific region of the road according to one form of the present disclosure.

Referring to the upper example shown in FIG. 8, the light emitted from a specific light source is projected onto the road while reciprocating along a linear path 810 in the lateral direction due to the vibration of the reflection surface 250. Referring to the lower example shown in FIG. 8, when it is intended to project the light only onto a specific region 820 within the path 810, the driving unit 300 may control the light source such that the light source is turned on only during the time period during which the light from the light source is projected onto the specific region 820 that is defined by two end points 821 and 822. The driving unit 300 may control the reflection unit such that the reflection unit maintains the vibration state irrespective of whether the light source is on or off. If control is repeatedly performed in this way while light is projected in the reciprocating manner, the light is projected only onto the specific region 820.

Through control in this manner, the light-emitting module is capable of projecting light onto a road on which an obstacle including a pedestrian is present. Therefore, a driver is capable of recognizing the presence of the obstacle using the light projected onto the road even when the obstacle does not appear in an image captured by a rear view camera. This will be described below with reference to FIG. 9.

Figure 9:
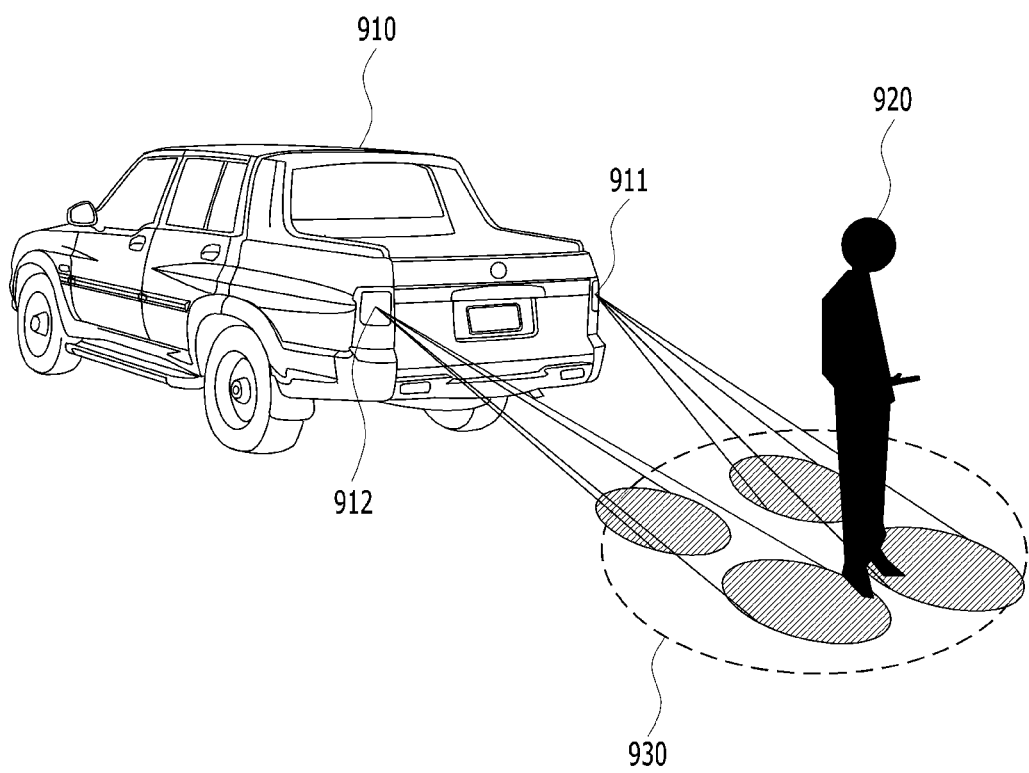
FIG. 9 shows an example of the execution of light projection control onto a road in response to detection of an obstacle.

FIG. 9 shows an example of the execution of light projection control onto a road in response to detection of an obstacle according to another form of the present disclosure. The light projection control shown in FIG. 9 will be described on the assumption that the light-emitting modules 911 and 912 are provided on the right-rear side and the left-rear side of the vehicle 910, respectively, and that each of the light-emitting modules 911 and 912 includes two light sources in order to project light beams onto two regions of the road that are spaced apart from the vehicle by respectively different distances.

Referring to FIG. 9, the vehicle 910 may sense the position of a pedestrian 920 using an ultrasonic sensor or a rear view camera. Based on the sensed position of the pedestrian 920, the control unit 500 for controlling the light-emitting modules may determine the vibration angle of the reflection unit 200 and the on/off timing of the light sources of the light-emitting modules so that light beams are projected onto the road 930 around the pedestrian 920. Thus, the light-emitting modules 911 and 912 may project light beams onto a plurality of spots of the road 930 around the pedestrian 920. For example, the light-emitting modules 911 and 912, each of which includes two light sources, project light beams onto four spots of the road at the same time. Thus, the light-emitting modules may be controlled such that the pedestrian 920 is located among the four projection spots or between at least two projection spots at all times depending on the distance between the pedestrian 920 and the vehicle 910.

The projected light beams may be controlled such that at least one of the brightness or color thereof is different depending on the distance between the vehicle 910 and the pedestrian 920. Here, in order to project light beams having different colors, light sources configured to emit light beams having specific color temperatures or specific colors may be used, or color filters may be disposed at the front sides of the light sources.

Hereinafter, the process of controlling light emission during backward driving using the light-emitting modules according to one form will be described with reference to FIG. 10.

Figure 10:
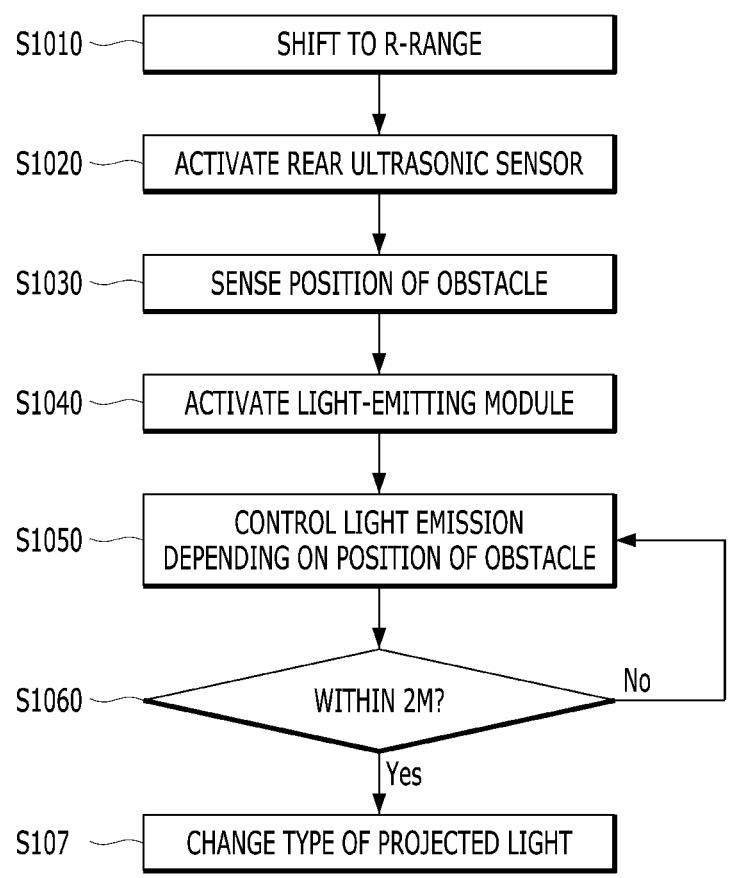
FIG. 10 is a flowchart showing an example of a process of controlling light emission during backward driving using the light-emitting modules.

FIG. 10 is a flowchart showing an example of the process of controlling light emission during backward driving using the light-emitting modules according to one form of the present disclosure.

Referring to FIG. 10, when a driver performs a shift to the R-range (S1010), the rear ultrasonic sensor may be activated (S1020).

When the position of an obstacle is recognized through the ultrasonic sensor (S1030), the light-emitting module may be activated (S1040). Subsequently, the light-emitting module may be controlled so as to project light onto a road at a position corresponding to the position of the obstacle (S1050). To this end, the control unit 500 may receive information about the state of the transmission from the controller collecting information about the state of the transmission, specifically the transmission controller, and information about the distance to the obstacle and the position of the obstacle from the ultrasonic sensor, may determine at least one of the type of light source to be turned on, the on/off pattern, the vibration frequency, or the vibration angle, and may transmit a signal corresponding to the determination result to the driving unit 300. The driving unit 300 may control the light emission of the light source unit 400 and the change in the direction of the current applied to the reflection unit 200 in response to the signal from the control unit 500.

If the sensed position of the obstacle is within a predetermined distance (here, 2 m) (S1060), the projection type of light emitted from the light-emitting module may be changed (S1070). Here, the change in the projection type of light may include a change in at least one of the color of the light projected onto the road, the intensity of the light projected onto the road, or the vibration frequency.

Although the configuration in which the light-emitting module is mounted to the rear side of the vehicle and projects light onto the road behind the vehicle has been described by way of example, this is merely illustrative. The present disclosure is not limited to a specific mounting position of the light-emitting module in the vehicle, a specific number of light-emitting modules, and a specific light projection direction.

The present disclosure described above may be implemented as a computer-readable code of a computer-readable medium in which programs are recorded. The computer-readable medium includes all kinds of recording devices in which data that may be read by a computer system is stored. Examples of the computer-readable medium may include a hard disk drive (HDD), a solid-state disk (SSD), a silicon disk drive (SDD), ROM, RAM, a CD-ROM, a magnetic tape, a floppy disk, and an optical data storage device.

As is apparent from the above description, a vehicle according to at least one form of the present disclosure configured as described above is capable of efficiently projecting light onto a road.

In particular, it is possible to selectively project light onto a plurality of spots of the road using a comparatively small number of light sources by controlling the vibration of a reflection plate having a comparatively simple structure. Thus, the light-emitting module may be reduced in size and may have improved operational efficiency.

In addition, it is possible to change the projection type of light depending on the position of a pedestrian through cooperation with various pedestrian-sensing devices. As a result, the pedestrian may easily recognize the projected light and the driver may also easily recognize the pedestrian in a low-luminance situation.

It will be appreciated by those skilled in the art that the effects achievable through the present disclosure are not limited to those that have been specifically described hereinabove, and other effects of the present disclosure will be more clearly understood from the above detailed description.

The above detailed description is not to be construed as limiting the present disclosure in any aspect, and is to be considered by way of example. The scope of the present disclosure should be determined by reasonable interpretation of the accompanying claims, and all equivalent modifications made without departing from the present disclosure should be included in the following claims.

What is claimed is:

1. A light-emitting module comprising:
a reflection unit; and
a light source unit configured to emit light to the reflection unit,
wherein the reflection unit comprises:
- a first pole magnet and a second pole magnet, facing each other while being spaced apart from each other;
- a plate, along an edge of which a wire is disposed in a multiple number of turns in one direction, the plate being disposed between the first pole magnet and the second pole magnet;
- a reflection surface disposed on an upper surface of the plate;
- a plurality of elastic members disposed on a lower surface of the plate, and wherein:
- the light source unit is configured to emit light to the reflection surface,
- the plurality of elastic members is disposed parallel to each other in a direction intersecting a direction of a magnetic flux generated by the first pole magnet and the second pole magnet,
- the plurality of elastic members extends vertically,
- the plurality of elastic members does not overlap with each other in the direction of the magnetic flux generated by the first pole magnet and the second pole magnet,
- the wire diverges from one end thereof into two pieces, and
- the two pieces of the wire extend from different points of the edge of the plate so as to form a same number of turns as each other in the one direction along the edge of the plate, and converge at an opposite end of the wire.

2. The light-emitting module according to claim 1, further comprising:
a driving unit configured to supply current to the wire,
wherein the driving unit is configured to alternately change a direction of the current.

3. The light-emitting module according to claim 2,
wherein the plurality of elastic members is configured to support the plate and allow vibration of the plate.

4. The light-emitting module according to claim 3, wherein the plate is configured to vibrate in a seesaw motion with respect to a position of the plurality of elastic members based on an alternate change in the direction of the current by the driving unit.

5. The light-emitting module according to claim 4, wherein light emitted from the light source unit is reflected by the reflection surface and is projected in a manner of reciprocating in a lateral direction in response to vibration of the plate.

6. The light-emitting module according to claim 5,
wherein the direction in which the plurality of elastic members is disposed parallel to each other is parallel to an axis of the seesaw motion.

7. The light-emitting module according to claim 3,
wherein the wire extends from the driving unit and is connected to the plate via the plurality of elastic members.

8. The light-emitting module according to claim 2, further comprising:
a control unit configured to determine at least one of an on/off pattern of the light source unit or a period at which the driving unit alternately changes the direction of the current.

9. The light-emitting module according to claim 8,
wherein the control unit is configured to determine at least one of the on/off pattern or the period based on a state of a transmission of a vehicle and a position of an obstacle sensed by a sensor.

10. The light-emitting module according to claim 1,
wherein, when current is supplied to the wire,
force is exerted on a first side portion of the plate that is adjacent to the first pole magnet in a first direction that intersects a direction of the current and a magnetic flux flowing direction between the first pole magnet and the second pole magnet, and
force is exerted on a second side portion of the plate that is adjacent to the second pole magnet in a second direction that is opposite to the first direction.

11. The light-emitting module according to claim 1, wherein the light source unit comprises a plurality of light sources.

12. The light-emitting module according to claim 11, wherein light sources of the plurality of light sources are disposed parallel to each other in a vertical direction, and light sources of the plurality of light sources have different angles of incidence from each other with respect to the reflection surface.

13. A vehicle comprising at least one light-emitting module according to claim 1.

14. The vehicle according to claim 13, wherein the at least one light-emitting module is disposed at a rear side of the vehicle so as to project light onto a road behind the vehicle.

* * * * *